US011971055B2

(12) United States Patent
Jung

(10) Patent No.: US 11,971,055 B2
(45) Date of Patent: Apr. 30, 2024

(54) FLUID ACTUATED WORKING CYLINDER AND METHOD OF MANUFACTURING THE SAME

(71) Applicant: Festo SE & Co. KG, Esslingen (DE)

(72) Inventor: Oliver D. Jung, Fürth (DE)

(73) Assignee: Festo SE & Co. KG, Esslingen (DE)

(*) Notice: Subject to any disclaimer, the term of this patent is extended or adjusted under 35 U.S.C. 154(b) by 0 days.

(21) Appl. No.: 17/890,410

(22) Filed: Aug. 18, 2022

(65) Prior Publication Data

US 2023/0059879 A1 Feb. 23, 2023

(30) Foreign Application Priority Data

Aug. 18, 2021 (DE) ..................... 10 2021 209 068.0

(51) Int. Cl.
*F15B 15/14* (2006.01)

(52) U.S. Cl.
CPC ... *F15B 15/1428* (2013.01); *F15B 2211/8855* (2013.01); *F15B 2215/305* (2013.01)

(58) Field of Classification Search
CPC ............ F15B 15/1428; F15B 2215/305; F15B 2211/8855
See application file for complete search history.

(56) References Cited

U.S. PATENT DOCUMENTS

| | | | | |
|---|---|---|---|---|
| 3,286,737 A * | 11/1966 | Kelly, Jr. | F16J 10/04 | 138/144 |
| 3,858,617 A * | 1/1975 | Takada | F16L 9/16 | 138/141 |
| 5,021,064 A * | 6/1991 | Caines | A61F 2/68 | 623/26 |
| 5,154,862 A * | 10/1992 | Reagan | C04B 41/5059 | 427/249.15 |
| 6,415,706 B1 | 7/2002 | Pöschl et al. | | |
| 7,412,956 B2 * | 8/2008 | Gotou | F15B 15/1428 | 123/193.2 |
| 7,931,403 B2 * | 4/2011 | Fish | F15B 15/1428 | 384/42 |
| 2006/0118194 A1 * | 6/2006 | Mechler | F15B 15/1428 | 156/274.2 |
| 2010/0077918 A1 * | 4/2010 | Holzl | F15B 15/1428 | 92/169.2 |

FOREIGN PATENT DOCUMENTS

| | | | |
|---|---|---|---|
| DE | 30 527 A1 | 11/1965 | |
| DE | 0234531 * | 9/1987 | F15B 15/1428 |
| DE | 196 14 505 C1 | 8/1997 | |
| EP | 0 234 531 A2 | 9/1987 | |
| EP | 0 331 124 A1 | 9/1989 | |
| WO | 2013/153079 A1 | 10/2013 | |

* cited by examiner

*Primary Examiner* — Dustin T Nguyen
(74) *Attorney, Agent, or Firm* — Hoffmann & Baron, LLP

(57) ABSTRACT

A fluid-actuated working cylinder having a cylinder housing enclosing a cylinder chamber and having a cylinder tube whose inner circumferential surface forms a piston running surface for a piston arranged in the cylinder chamber wherein the cylinder tube is a composite body having a tubular inner layer and a tubular support jacket surrounding the tubular inner layer with a radial support effect and wherein the tubular inner layer is made of a diffusion-tight glass material or ceramic material, while the support jacket has a cellulose-containing and/or lignin-containing material structure.

18 Claims, 3 Drawing Sheets

FLUID ACTUATED WORKING CYLINDER AND METHOD OF MANUFACTURING THE SAME

BACKGROUND OF THE INVENTION

The invention relates to a fluid-actuated working cylinder, in particular a pneumatic cylinder. Furthermore, the invention relates to a method for manufacturing such a fluid-actuated working cylinder.

From WO 2013/153079 A1, a fluid-actuated working cylinder referred to as a piston-cylinder unit is known, which has a cylinder housing comprising a tubular cylinder jacket, a cylinder base and a cylinder head. The cylinder housing bounds a cylinder chamber in which a piston connected to a piston rod is arranged. The cylinder jacket is made, at least in sections, of a windable, sheet-like or film-like material. This material is, for example, aluminum, sheet steel, stainless steel, paper or plastic. During production of the working cylinder, the windable material is wound onto an inner tube of sheet steel acting as a support, which subsequently remains in place or is removed.

DE 196 14 505 C1 discloses an actuator with a cylinder housing, a piston displaceable therein and a piston rod attached to the piston. The cylinder housing is made entirely of ceramic, in particular SiSiC ceramic.

EP 0 234 531 A2 discloses a motion cylinder with a cylinder housing consisting of glass, which can be coated on the outside with a transparent plastic, sheathed with a wire mesh or sandwiched with a layer sequence of plastic and metal to increase the strength of the glass cylinder housing.

A fluid-actuated working cylinder is known from U.S. Pat. No. 3,286,737, the cylinder housing of which has a cylinder tube comprising an outer layer of plastic reinforced with organic reinforcing fibers and an inner layer of curable plastic mixed with lubricating particles.

SUMMARY OF THE INVENTION

The invention is based on the task of taking measures that enable a reliable fluid-actuated working cylinder to be manufactured in a way that conserves resources and at the same time is cost-effective.

This task is solved by a fluid-actuated working cylinder, in particular a pneumatic cylinder, having a cylinder housing and a piston which is arranged in a cylinder chamber enclosed by the cylinder housing so as to be displaceable by the action of fluid, the cylinder housing having a cylinder tube, the inner circumferential surface of which forms a piston running surface, against which the piston bears in a slidingly displaceable manner, the cylinder tube being designed as a composite body with a tubular inner layer forming the piston running surface and a tubular support jacket enclosing the tubular inner layer with a radial support effect, wherein the inner layer consists of a diffusion-tight, in particular diffusion resistant, glass material or diffusion-tight, in particular diffusion resistant, ceramic material and wherein the support jacket has a cellulose-containing and/or lignin-containing material structure.

The task is further solved by a method for producing a fluid-actuated working cylinder formed in the aforementioned sense, wherein the cylinder tube is produced by means of the following method steps: producing the tubular inner layer from a diffusion-tight glass material or diffusion-tight ceramic material, producing the tubular support jacket from a cellulose-containing material and/or from a lignin-containing material, and producing the composite body by either separately producing each of the tubular inner layer and the tubular support jacket independently of each other and then joining them together, or by separately producing the tubular inner layer or the tubular support jacket and then forming the other of these two components thereon during their original forming.

A fluid-actuated working cylinder designed and/or manufactured in this way offers the same application possibilities as conventional working cylinders, but combines this with a design characterized by sustainability. The cylinder tube of the cylinder housing does not have a uniform material structure, but is designed as a composite body which has coaxially enclosing tube structures which differ fundamentally from one another in their structure depending on their function. An inner tubular structure consists of a tubular inner layer whose main task is to seal off the cylinder chamber from the environment in a gas-tight manner in the radial direction and at the same time to define a very smooth piston running surface against which the piston arranged in the cylinder chamber bears with low friction so that extremely low-wear stroke movements of the piston are possible. To ensure these properties, the inner layer is made of a glass material or ceramic material possessing diffusion-tight/diffusion resistant properties. These materials can ensure the desired properties even with a very thin layer thickness, so that the material requirement for these high-quality materials can be kept very low, which in turn has a positive effect on the manufacturing costs. In particular, the inner layer is so thin that it alone would not be able to withstand the loads and stresses occurring during normal operation of the working cylinder, especially with regard to internal pressure resistance and mechanical stability. Responsible for this aspect is the tubular support jacket surrounding the inner layer, which radially supports the inner layer from the outside and gives the inner layer the necessary dimensional stability even with extremely thin layer thickness of the inner layer. As the supporting jacket has a cellulose-containing and/or lignin-containing material structure, it can be produced in a resource-saving manner from renewable raw materials using sustainable production methods and can be fully recycled at the end of its lifecycle. The radial thickness of the support jacket can be selected during production of the working cylinder according to the desired strength requirement. Even with a relatively large jacket thickness, the fully recyclable material structure allows a relatively low weight to be maintained. Since the support jacket does not directly contribute to the definition of the cylinder chamber and the piston running surface, the requirements placed on it in terms of dimensional accuracy and tolerances are at a low level, which is also reflected in reduced manufacturing costs.

In the manufacture of the working cylinder, the cylinder tube can be produced in particular by two alternative basic production methods. Either the tubular inner layer or the tubular support jacket are manufactured separately, independently of one another, and then suitably combined to produce the composite body, or only one of these two components is manufactured separately and then the other component is molded onto the previously separately manufactured component during its primary forming.

Advantageous further embodiments of the invention are shown in the subclaims.

The layer thickness of the tubular inner layer is preferably extremely thin and is expediently in a thickness range of 0,001 mm to 0.1 mm Such thin layers can advantageously be produced from the plasma phase in PVD or CVD processes. A preferred thickness range for the thickness of the inner layer, especially when taking manufacturing costs into account, is between 0.01 mm and 0.1 mm.

In the range specifications, the range limits are included in each case. The layer thickness of the inner layer is expediently constant throughout.

It is considered advantageous if the tubular support jacket has a fiber composite consisting of natural fibers. Particularly in this context, it is advantageous if the support jacket is made at least partially, and expediently in its entirety, of paper and/or cardboard and/or paperboard. Preferably, the fibrous materials used to produce the fiber composite comprise cellulose or lignin or a combination of these two organic compounds.

A likewise advantageous structure of the support sheath is based on grass and/or hemp and/or sisal as the base material. A very stable fiber composite for the support jacket can also be realized from such natural fibers in a cost-effective and recyclable manner. Alternatively, however, the support jacket can also be or be made from a wood fiber composite material, for example.

In an expedient further development of the working cylinder, the support jacket consists at least partially and preferably in its entirety of a pickled and/or bleached material. This provides, in particular, the possibility of easily realizable coloring of the support jacket. For example, on the basis of starting materials pickled in different colors, support jackets with different coloring can be realized in order, for example, to make working cylinders of different sizes very easily visually distinguishable.

The glass material forming the inner layer is preferably a silicate glass. Such glass material is characterized by extremely high hardness and wear resistance while ensuring the desired diffusion tightness/diffusion resistance.

For an inner layer of ceramic material, the use of silicon carbide, in particular sintered silicon carbide, is particularly recommended. Alternatively, however, other ceramic materials can also be used, for example based on aluminum oxide or zirconium oxide.

In an expedient embodiment of the working cylinder, the tubular inner layer is a tubular body manufactured independently of the support jacket. The tubular inner layer prefabricated in this way is then combined with the tubular body, with the tubular body either also being prefabricated separately or being produced directly on the tubular inner layer during its initial forming.

Separate production of the tubular inner layer, independent of the support jacket, is carried out, for example, by peripheral application of an inner layer starting material to a mandrel-shaped mold core of a molding tool. This can be done, for example, by moldless spraying of the glass material or ceramic material, or by encapsulation with this material in a mold tool designed for this purpose, for example in the manner of an injection mold.

The inner layer can be a tubular body that is inherently stable independently of the support jacket. Although the strength is not sufficient to withstand the stresses occurring during the intended operation of the working cylinder, it is sufficient to ensure easy handling during the manufacturing process of the cylinder tube due to the dimensional stability.

For example, the inner layer consisting of glass material is tubular glass manufactured in tubular form. During its manufacture, such tubular glass is drawn from the molten glass into a tubular shape and then cut to the length required for the tubular inner layer. Tubular glass can be produced with a very low wall thickness, making it ideal for the composite cylinder housing.

Alternatively, the tubular inner layer consisting of glass material may in particular be a tubular body formed from a flexible glass film originally produced in a flat form. For example, a sheet of film can be cut from a continuous glass film, which is then bent to form a tubular shape and joined together at the facing end sections of the sheet, for example in a materially bonded manner by brief heating.

In an expedient embodiment, the support jacket comprises a support jacket material applied to the outer circumferential surface of the prefabricated tubular inner layer during its original forming and solidified only after application.

For example, an already tubular support jacket structure can be applied to the tubular inner layer in the as yet unconsolidated state, which, during solidification, forms the support jacket and fits snugly around the outer circumference of the tubular inner layer.

It is considered particularly expedient to form the tubular support jacket as an injection molded body applied to the outer circumferential surface of the tubular inner layer during its original forming. The support jacket material can be sprayed on in a form-free manner by means of an injection or spray jet, or in a form-bound manner by injection molding in an injection mold in which the prefabricated tubular inner layer is arranged as an insert.

The support jacket does not necessarily have to be produced on the inner layer during its original forming. Alternatively, the tubular support jacket can be a tubular body manufactured independently of the inner layer. Preferably, in this case, the tubular support jacket is an extrusion body produced by extrusion or an injection-molded body produced by injection molding.

It is advantageous if the support jacket, which is manufactured separately from the inner layer, has an inherent stability that ensures its tubular shape even without the inner layer. This simplifies handling during subsequent combination with the inner layer or with the inner layer material.

In a preferred embodiment, the inner layer is implemented as a coating layer applied to the inner circumferential surface of the previously manufactured tubular support jacket by a material application process. Any known coating process can be used for this purpose. The application layer is, for example, a sputter layer if the starting material of the inner layer is applied by sputtering. Further embodiments for an application layer that can be produced particularly inexpensively are a vacuum deposition layer or a rotational coating layer. The vacuum deposition layer can be produced, for example, by means of one of the two PVD processes or CVD processes already mentioned above. The rotational coating layer is producible or generated by rotational coating, also called “spin coating”. With these processes, extremely thin inner layers can be realized, which are in the thickness range mentioned further above.

According to a preferred embodiment, the cylindrical tubular composite body may comprise a prefabricated tubular support jacket and a prefabricated tubular inner layer, which are inserted coaxially into one another and thus joined coaxially. These two tubular components have, for example, diameters matched to one another before being inserted into one another in such a way that there is an interference fit between the two components when inserted into one another. In addition or alternatively, there can be a material bond in the hollow cylindrical joining area between the outer circumference of the inner layer and the inner circumference of the support jacket, for example caused by an adhesive bond and in particular by means of a hollow cylindrical adhesive layer.

Preferably, the tubular inner layer is cylindrical and smooth-surfaced not only on its inner circumferential surface representing the piston running surface but also on its radial outer circumferential surface. However, according to an expedient further development, this outer circumferential surface can also be structured in such a way that radial elevations and depressions are present, so that a radial engagement results between the inner layer and the support jacket, from which a form fit results in the longitudinal direction of the cylinder tube, which holds the two components together in an immovable manner.

In another advantageous embodiment, the cylinder tube includes a coextruded body comprising the tubular support jacket and the tubular inner layer. Both components of the cylinder tube are produced by extrusion and are coaxially joined together during extrusion, so that one can speak of co-extrusion. Coextruded cylinder tubes of this type can be very easily customized to the desired length dimensions.

In a particularly cost-effective embodiment, the cylinder tube consists exclusively of the tubular inner layer and the coaxial tubular support jacket. For special applications, however, provision can be made for the support jacket to be enclosed all around on the outside by a separate diffusion-tight cladding layer or, alternatively, to be impregnated. In this way, media resistance to media in the immediate vicinity can be produced if required. A diffusion-tight enveloping layer can, for example, be applied inexpensively as a shrink film.

In addition to the cylinder tube, the cylinder housing of the working cylinder expediently contains two end walls, each arranged in the region of one of the two axial end faces of the cylinder tube, which end walls are attached to the cylinder tube and bound the cylinder chamber at the end face. At least one end wall and preferably each end wall is expediently formed separately with respect to the cylinder tube and attached as a cylinder cover. The fastening can be produced, for example, by a material connection such as welding or gluing, or by mechanical fastening means such as screw connections or tie rods.

At least one end wall can alternatively be formed integrally with the cylinder tube.

At least one and in particular each end wall is expediently penetrated by a drive fluid channel enabling the supply and discharge of a fluidic pressure medium for driving the piston. At least one such drive fluid channel can alternatively also be formed as a radial through-hole at the adjacent end region of the cylinder tube.

The two end walls may have a conventional structure and may, for example, be made of metal such as aluminum or stainless steel, or may be made of plastic material. However, it is also expedient for the end walls to be realized as a composite body comparable to the cylinder tube. In this context, preferably at least one and expediently each end wall having a diffusion-tight/diffusion resistant inner wall layer facing the cylinder chamber and a wall outer layer which is thicker in this respect and acts as a support layer for the inner wall layer. While the inner wall layer consists of a diffusion-tight glass material or diffusion-tight ceramic material, the outer wall layer has a cellulose-containing and/or lignin-containing material structure. With regard to the materials and the mutual bonding of the wall inner layer and wall outer layer, the explanations given above with regard to the cylinder tube apply.

A piston rod which passes through the cylinder housing and projects axially from the cylinder housing is expediently arranged on the piston. The piston rod expediently passes through an end wall of the cylinder housing, wherein a guide and sealing device for sealed sliding guidance of the piston rod is preferably present in the penetration region. For example, a sealing ring and a guide bushing are inserted in a coaxial arrangement with respect to the piston rod in an axial wall penetration of an end wall through which the piston rod passes.

BRIEF DESCRIPTION OF THE DRAWINGS

The invention is explained in more detail below with reference to the accompanying drawing. In this show.

DETAILED DESCRIPTION

In FIGS. 5 to 9, the components of the cylinder tube are each shown in longitudinal section.

Figure 1:
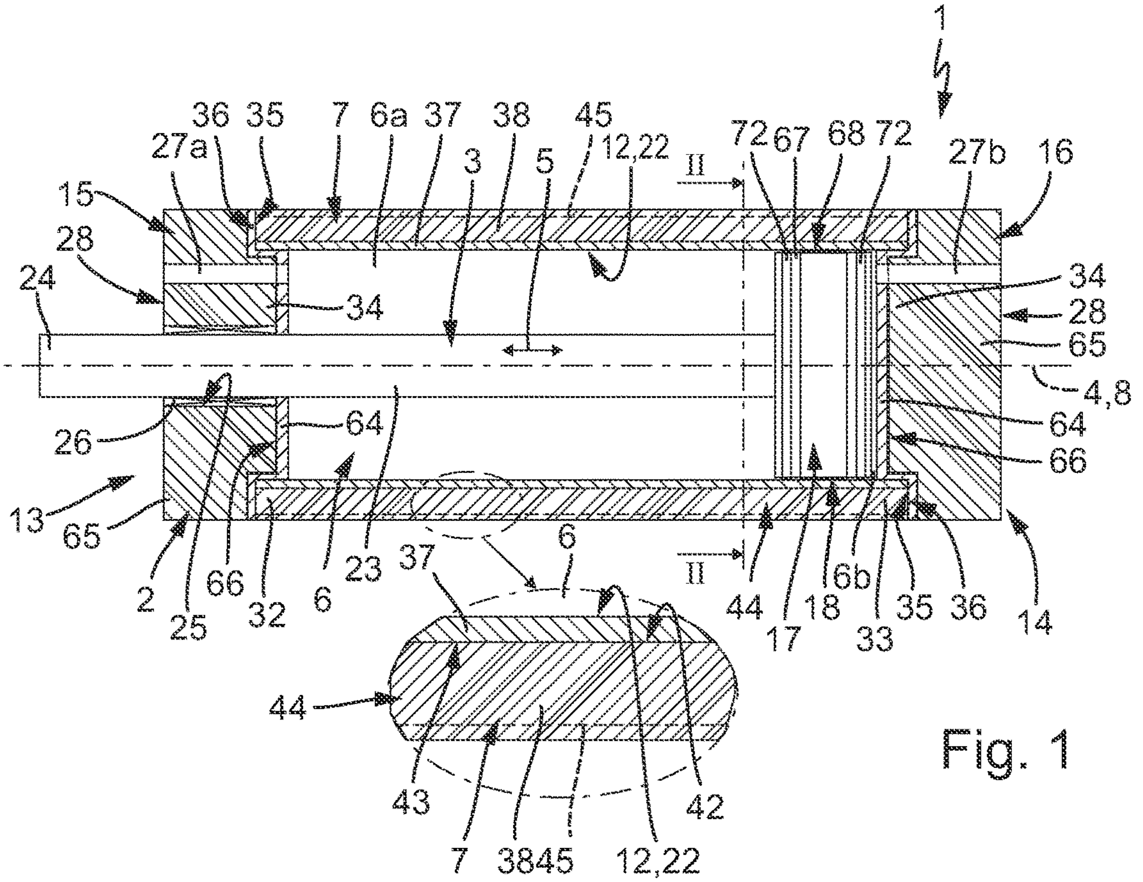
FIG. 1 a preferred design of the fluid-actuated working cylinder according to the invention in a longitudinal section according to sectional plane I-I of FIG. 2, whereby a region of the cylinder tube framed by dashed dots is also separately illustrated again in a sectional enlargement, FIG. 2 a cross-section of the working cylinder from FIG. 1 according to sectional plane II-II from FIG. 1, FIG. 3 a section of an alternative design of the cylinder tube of the fluid-actuated working cylinder corresponding to the enlarged section shown in FIG. 1, FIG. 4 a section of the cylinder tube of a further advantageous embodiment of the fluid-actuated working cylinder corresponding to the enlarged section of FIG. 1, FIG. 5 a process step in the manufacture of a working cylinder according to the invention, in which the tubular inner layer is a tubular body manufactured independently of the support jacket, FIG. 6 a process step in the manufacture of a working cylinder according to the invention, the support jacket of which is produced directly on the prefabricated inner layer during its initial forming, FIG. 7 a process step in the manufacture of a working cylinder according to the invention, the support jacket of which is a tubular body manufactured independently of the inner layer, the inner layer being applied subsequently as a coating layer to the inner circumference of the prefabricated support jacket, FIG. 8 a process step in the manufacture of a working cylinder according to the invention, in which the inner layer and the support jacket are manufactured separately from one another and then joined together, FIG. 9 a process step in the production of a working cylinder according to the invention, in which the working cylinder is a coextruded body produced by coextrusion of the support jacket and the inner layer, and FIGS. 10 and 11 preferred process sequences in a process for producing the working cylinder in schematic representation.
Figure 2:
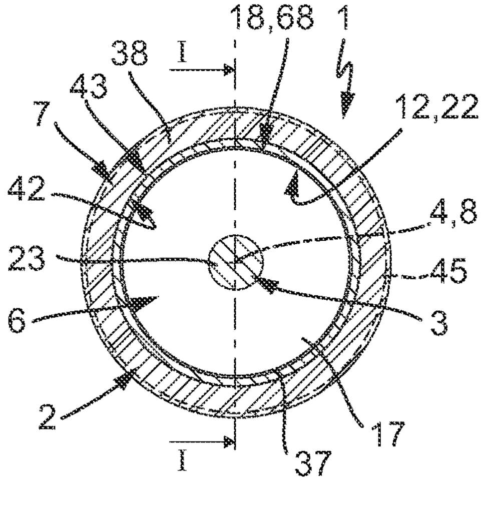
Figure 3:
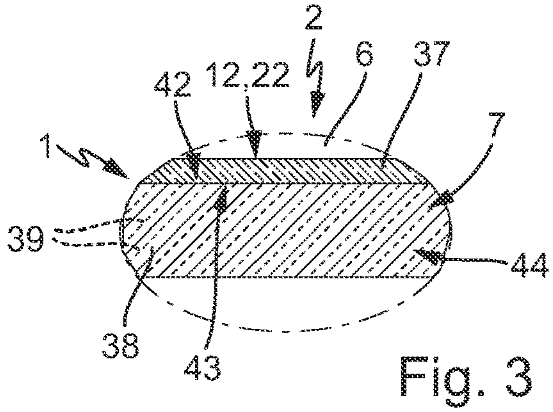
Figure 4:
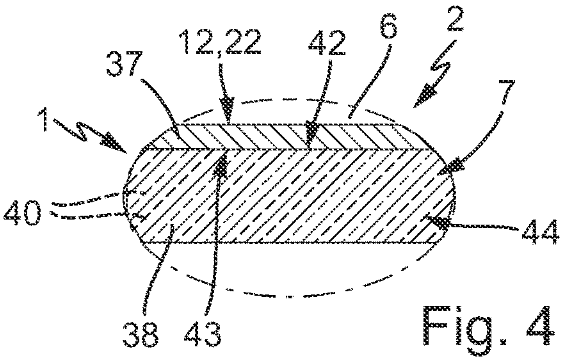

FIGS. 1 and 2 illustrate a fluid-actuated working cylinder 1, which has a cylinder housing 2 and an output unit 3 displaceable in this respect by fluid force. FIGS. 3 and 4 each show a section of a cylinder housing 2 of a working cylinder 1, the basic structure of which corresponds to that of FIGS. 1 and 2.

The working cylinder 1 has a longitudinal axis 4 indicated by dashed dots, whereby the output unit 3 can execute a linear stroke movement 5 oriented in the axial direction of the longitudinal axis 4 and indicated by a double arrow relative to the cylinder housing 2. The output unit 3 is thereby alternatively movable in one of the two axial directions of the longitudinal axis 4 in each case.

The driving force for generating the stroke movement 5 can be caused by a fluidic pressure medium, which can be supplied to the working cylinder 1 and discharged from the working cylinder 1 by means of a control valve device not further illustrated. This fluidic pressure medium is also referred to below as the drive medium. The drive medium is preferably compressed air, in which case the working cylinder 1 represents a pneumatic cylinder. However, the working cylinder 1 can also be operated with other pressurized gases or also with a pressurized fluid.

The cylinder housing 2 preferably has a longitudinal extension in the axial direction of the longitudinal axis 4. It encloses a cylinder chamber 6 extending in the axial direction of the longitudinal axis 4, which has a round and, in particular, a circular cross-section, which is readily apparent from FIG. 2.

Radially outwardly, the cylinder chamber 6 is bounded all around by a cylinder tube 7 of the cylinder housing 2. The cylinder tube 7 has a longitudinal axis 8 which has the same orientation as the longitudinal axis 4 of the working cylinder 1 and which conveniently coincides with the longitudinal axis 4 of the working cylinder 1.

The cylinder tube 7 has a cylindrical inner circumferential surface 12 which surrounds the cylinder chamber 6 radially around the outside.

The cylinder housing 2 has two end faces 13, 14 opposite each other in the axial direction of the longitudinal axis 4, which are also referred to below as the front face 13 and rear face 14 of the cylinder housing 2 for better differentiation. The cylinder chamber 6 is closed in the area of the front side 13 by a front end wall 15 and in the area of the rear side 14 by a rear end wall 16 of the cylinder housing 2. Both end walls 15, 16 are connected to the cylinder tube 7 in a fluid-tight manner. The cylinder tube 7 extends axially between the two end walls 15, 16.

The output unit 3 has a piston 17 received in the cylinder chamber 6 so as to be linearly displaceable while executing the stroke movement 5. During the working movement 5, the piston 17 can slide along the inner circumferential surface 12 of the cylinder tube 7 with its radially outwardly pointing piston circumferential surface 18. Accordingly, the inner circumferential surface 12 defines a piston running surface 22 which is shaped in accordance with the inner circumferential surface of a hollow cylinder.

In addition to the piston 17, the output unit 3 includes a piston rod 23 extending in the axial direction of the longitudinal axis 4 and attached to the piston 17, so that the piston 17 and the piston rod 23 are always movable only uniformly linearly relative to the cylinder housing 2 while jointly executing the stroke movement 5. Exemplarily, the piston rod 23 is screwed or welded or pressed to the piston 17 in a manner not further illustrated.

The piston 17 divides the cylinder chamber 6 into a front working chamber 6*a* bounded by the front end wall 15 and a rear working chamber 6*b* bounded by the rear end wall 16. The piston rod 23 extends from the piston 17 toward the front 13 of the cylinder housing 2, passing through the front working chamber 6*a* and the front end wall 15. The piston rod 23 projects out of the cylinder housing 2 in the area of the front 13 and has an outer piston rod end section 24 that is always located outside the cylinder housing 2, regardless of the stroke position of the output unit 3.

The piston rod 23 passes axially movably through a wall aperture 25 of the front end wall 15, in which it is radially supported with respect to the front end wall 15 and is also expediently dynamically sealed. For this purpose, a guide and sealing device 26, which encloses the piston rod 23 and is only indicated schematically in the drawing, is expediently located in the wall opening 25.

The illustrated working cylinder 1 is of a double-acting design. Into each working chamber 6*a*, 6*b* opens one of two drive fluid channels 27*a*, 27*b* which pass through the cylinder housing 2 and through which the drive fluid can be supplied and discharged in order to apply to the piston 17 a pressure force causing the stroke movement 5. Each drive fluid channel 27*a*, 27*b* has a connection opening 32 which opens at an outer surface 28 of the cylinder housing 2 and to which a fluid line leading to the control valve device already mentioned can be connected.

The two drive fluid channels 27*a*, 27*b* extend expediently exclusively in one of the two end walls 15, 16. Exemplarily, the front end wall 15 is penetrated by the front drive fluid channel 27*a* and the rear end wall 16 by the rear drive fluid channel 27*b*. Expediently, the drive fluid channels 27*a*, 27*b* extend exclusively in the end walls 15, 16 and not in the cylinder tube 7. With such a ductless cylinder tube 7, the working cylinder 1 can be manufactured particularly inexpensively.

Deviating from the illustrated embodiment example, the working cylinder 1 can also be realized in a single-acting design. In this case, only one of the two drive fluid channels 27*a*, 27*b* is used for controlled fluid admission, while a return spring is arranged in the working chamber 6*a* or 6*b* communicating with the unused drive fluid channel 27*b*, 27*a*.

The stroke movement 5 can be tapped at the outer piston rod end portion 24 to actuate any object, for example a machine element.

The piston 17 expediently has a one-piece or multi-piece piston base body 67, to which the piston rod 23, made for example of metal or of plastic, is attached. A cylindrical guide surface 68 extends around the piston base body 67 in the region of the radial piston circumferential surface 18, with which the piston 17 bears in a slidingly displaceable manner against the piston running surface 22. The guide surface 68 is exemplarily formed on a guide ring which surrounds the piston base body 67.

The piston base body 67 expediently also carries an annular sealing device 72, which also rests in a slidingly displaceable manner against the piston running surface 22, so that a fluid-tight separation between the two working chambers 6*a*, 6*b* is ensured irrespective of the stroke position of the piston 17. Exemplarily, the sealing device 72 consists of two sealing rings which are fixed axially on both sides of the guide surface 68 on the radial outer circumference of the piston base body 67.

Although at least one end wall 15, 16 may well be formed integrally with the cylinder tube 7, it is considered advantageous if both end walls 15, 16 are formed as separate cylinder housing components with respect to the cylinder tube 7. Each separate end wall 15, 16 thereby forms an end cover which is attached to the cylinder tube 7 with sealing in the region of the associated front side 13 and rear side 14, respectively. Such a multi-part structure is present in the exemplary cylinder housing 2.

Exemplarily, the two end walls 15, 16, which are designed as individual end covers, are attached to the cylinder tube 7 at the end face and are attached in a sealed manner to the respective associated axial end section of the cylinder tube 7 by means of an adhesive connection. Preferably, each end wall 15, 16 has a concentrically stepped axial inner side so that a central, externally cylindrically shaped axial centering projection 34 results, which is framed by an annular mounting surface 35 facing the cylinder tube 7. Each end wall 15, 16 dips with its centering projection 34 radially supported into the associated axial end section 32, 33 of the cylinder tube 7, while at the same time the adjacent mounting surface 35 is supported on the annular end surface 36 of the cylinder tube 7 facing it. In particular, the adhesive used for said adhesive connection is applied between each mounting surface 35 and the annular end surface 36 facing it.

In a non-illustrated embodiment, the two end walls 15, 16 formed as end covers are axially braced to the cylinder tube 7 by means of tie rods extending along the cylinder tube 7. In this case, an adhesive connection can be dispensed with. However, it is expedient in this case to arrange a seal between each end wall 15, 16 and the cylinder tube 7.

A special feature of the working cylinder 1 is that the cylinder tube 7 is formed as a composite body having a tubular inner layer 37 and a tubular support jacket 38 radially externally surrounding this tubular inner layer 37. The tubular support jacket 38 has an inner circumferential surface 42 facing the longitudinal axis 8, which is in contact with the outer circumferential surface 43 of the tubular inner layer 37 facing it and pointing radially outwards with respect to the longitudinal axis 8, and thereby develops a radial support effect all around with respect to the inner layer 37.

While the inner circumferential surface 42 of the supporting jacket 38 is suitably shaped according to the inner circumferential surface of a hollow cylinder, the outer circumferential surface 43 of the inner layer 37 suitably has a cylindrical shape. In both cases, the cross-section is suitably circularly contoured.

For simplicity, the term "tubular" will also be partially omitted from the designation of the inner layer 37 and the support jacket 38 in the following.

Expediently, the inner layer 37 and the support jacket 38 are firmly connected to each other so that, at least during the intended use of the working cylinder 1, no relative movements are possible between these two tubular structures.

Expediently, the inner layer 37 and the support jacket 38 are formed with the same length in the axial direction of the longitudinal axis 8. Preferably, they both end flush with each of the two annular end faces 36.

Together, the inner layer 37 and the support jacket 38 form a tube wall 44 of the cylinder tube 7 which is round and, in particular, circular when viewed in cross section radially inwardly and radially outwardly, and which is double-walled in the radial direction, the inner layer 37 forming a tube inner wall and the support jacket 38 forming a tube outer wall.

The inner layer 37 consists of either a diffusion-tight glass material or a diffusion-tight ceramic material. These very hard materials permit extremely low-wear operation of the working cylinder 1 and ensure low-friction and smooth stroke movement 5 when the piston 17 slides with its radial guide surface 68 over the piston running surface 22. Due to the diffusion-tight properties of the materials, the cylinder tube 7 effects, by means of the inner layer 37, a leakage-free closure of the cylinder chamber 6 at its radial outer circumference, even when high operating pressures are imposed.

In favour of low weight and low material consumption of the very high-quality glass or ceramic material, the layer thickness of the inner layer 37 measured in the radial direction with respect to the longitudinal axis 8 is expediently selected to be extremely small. Preferably, the layer thickness is constant throughout.

In the illustrated embodiment examples, the layer thickness of the inner layer 37 is in a range between 0.01 mm and 0.05 mm.

Expediently, a layer thickness of 0.1 mm is not exceeded at any point. In principle, however, there are no functional limits at the bottom, only manufacturing limits. For example, the layer thickness can be as little as 0.001 mm Such layer thicknesses can be produced with a high degree of reliability, for example by PVD or CVD.

In principle, the preferred layer thickness for the inner layer 37, including the range limits, is between 0,001 mm and 0.1 mm and expediently in a thickness range between 0.01 mm and 0.1 mm.

Since such a thin inner layer 37, considered on its own, is not capable of withstanding the fluid pressures usually occurring in the cylinder chamber 6 during operation of the fluid-actuated working cylinder 1—maximum operating pressures are often at least 6 bar—, the inner layer 37 is enclosed radially on the outside by the aforementioned support jacket 38, which radially supports the tubular inner layer 37 all around and stabilizes it in its hollow-cylindrical shape of use while preventing radial deformation. As a result, the piston running to surface 22 also has a very high degree of shape fidelity.

A special feature of the support jacket 38 is that it has a low-cost, lightweight and yet extremely stable structure, the whole combined with complete recyclability at the end of its lifecycle. The cylinder tube 7 is made of renewable raw materials in particular in a way that conserves resources. From a very general point of view, the support jacket 38 has a cellulose-containing and/or lignin-containing material structure, in contrast to metal and plastic concepts commonly used in this field.

Considering these material properties, in all illustrated embodiments, the support jacket 38 has or comprises a fiber composite consisting of natural fibers.

A particularly advantageous structure is implemented in the cylinder tube 7 of the working cylinder 1 illustrated in FIGS. 1 and 2. Here, the support jacket 38 consists in its entirety of paper or cardboard or paperboard. Which of these three material categories is present can be selected in the manufacture of the working cylinder 1, taking into account the operational requirements. The distinction is based mainly on basis weight, with the basis weight of paper being lower than that of cardboard and paperboard. In most cases, paper is referred to as having a basis weight of up to around 150 $g/m^2$, and cardboard as having a basis weight above this. Cardboard is usually referred to from a specific weight of 300 $g/m^2$.

Preferably, the support jacket 38 is made uniformly of paper or cardboard or paperboard, but it can also have areas of such different basis weights that the fiber composite can have any combination of the three material categories mentioned or even just two of these material categories. In this way, for example, areas of different stability and radial support effect can be created with the wall thickness of the support jacket 38 remaining constant over the entire length of the pipe.

In the embodiment example of FIGS. 1 and 2, the support jacket 38 consists of a cellulose base. In contrast, in the embodiment example of FIG. 3, the support jacket 38 is lignin-based, and the support jacket 38 of the embodiment example illustrated in FIG. 4 contains a combination of both cellulose and lignin.

Suitable plants are used to obtain the cellulose molecules and/or lignin molecules used to make the support jacket 38. Preferably, wood is used as the base material, although grass or hemp or sisal, for example, can also be used as the base material.

Also considered advantageous is an embodiment in which the support jacket 38 comprises a wood fiber composite material. In this case, wood fibers of suitable size can be mixed together and pressed into an extremely stable fiber composite using, in particular, a vegetable or other recyclable adhesive.

In the embodiments of FIGS. 1, 2 and 4, the tubular inner layer 37 comprises a glass material. The glass material is preferably a silicate glass. The silicate glass, which is mainly composed of silicon dioxide, can be produced with particular hardness and correspondingly high wear resistance. Silicate glass is preferred in the realization of the working cylinder 1 to an organic glass such as acrylic glass, which can also be used in principle.

The glass material of the inner layer 37 is expediently a silicate glass as a whole, but can also be, for example, a glass material composite with silicate glass as the main component.

In the working cylinder 1 according to FIG. 3, the tubular inner layer 37 consists of a ceramic material. The ceramic material is preferably silicon carbide. Preferably, it is an engineering ceramic such as a sintered silicon carbide or a reaction bonded silicon carbide.

Other ceramics can also be used to realize the inner layer 37, for example alumina or zirconia.

In the manufacture of the double-walled cylinder tube 7, the materials mentioned for the inner layer 37 and the supporting jacket 38 respectively can be combined with each other as desired. The support jacket 38 may be combined with an inner layer 37 of glass material or of ceramic material, regardless of its material composition. Likewise, the inner layer 37 may be combined with a support jacket 38 composed of any one or more of the support jacket materials described further above, regardless of its material composition.

For example, by way of example, in the case of the working cylinder 1 of FIGS. 1, 2 and 4, it is possible to realize the inner layer 37 from a diffusion-tight ceramic material instead of a diffusion-tight glass material, and in the case of the working cylinder 1 of FIG. 3, it is possible to realize the inner layer 37 there consisting of a ceramic material from a glass material.

In particular, if a particular coloring of the working cylinder 1 visible from the outside of the working cylinder 1 is desired, the support jacket 38 can be made entirely or partially of a pickled material and/or of a bleached material. This is exemplarily the case with the support jacket 38 according to FIG. 3, the pickling and/or bleaching 39 being indicated by stippling in the drawing.

In particular, if there are increased requirements for media compatibility of the cylinder housing 2 with respect to external media, for example when the working cylinder 1 is used in areas susceptible to contamination and/or in humid areas, it is advantageous if at least the cylinder tube 7 has suitable protection in the region of its outer circumference. In this respect, an advantageous design is indicated by dashed lines in FIGS. 1 and 2, in which the support jacket is enclosed radially on the outside all around by a diffusion-tight cladding layer 45. The enveloping layer 45 is, for example, a shrunk-on protective film. If required, the enveloping layer 45 can additionally extend externally beyond the two end walls 15, 16, in particular if the latter have a comparable composite structure to that of the cylinder tube 7.

Alternatively, protection against environmental influences can also be obtained by impregnating the support jacket 38 after manufacture. Exemplarily, this is the case in the embodiment example of FIG. 4, where the impregnation 40 is indicated by dashing. If the support jacket 38 consists of a fiber composite or of paper and/or cardboard and/or paperboard, it is particularly well suited for an impregnation treatment, since the impregnating agent penetrates very well into the support jacket material and can impregnate the same well.

In a preferred embodiment, the tubular inner layer 37 is a tubular body that was manufactured independently of the support jacket 38 during production of the working cylinder. Exemplarily, this applies to the embodiment example of FIGS. 1 and 2. In this context, FIG. 5 shows snapshots during the execution of a process for manufacturing the fluid-actuated working cylinder 1.

Figure 5:
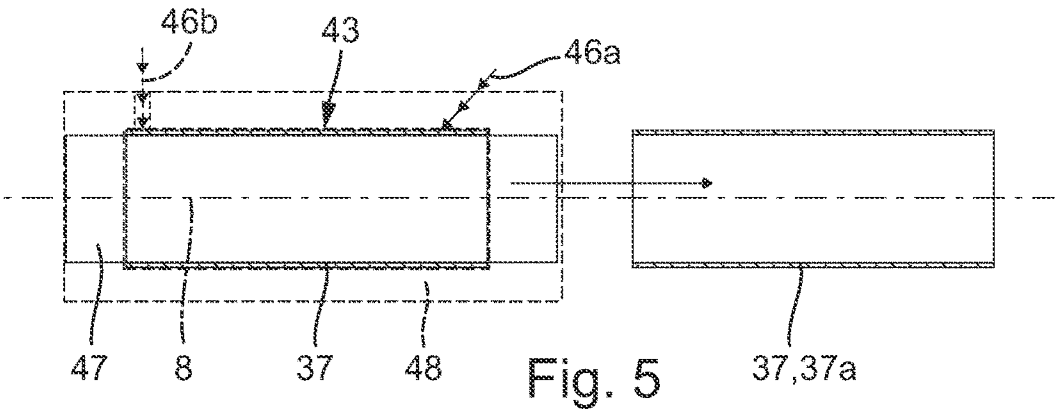

In the left half of FIG. 5, it is illustrated how the inner layer 37 is produced by peripherally applying an inner layer starting material 46*a* or 46*b* to a previously provided mandrel-shaped mold core 47. In one possible process sequence, the inner layer starting material 46*a* is sprayed onto the uncoated mold core 47 in a form-free manner using a spray process. For example, flowable silicon carbide is sprayed on and then fired to solidify it. For firing, the mold core 47 coated with the inner layer starting material 46*a* is conveniently placed in a firing furnace not further illustrated.

In an alternative manufacturing process, the mold core 47 placed in a mold 48 indicated by dashed lines in FIG. 5 is coated with a flowable inner layer starting material 46*b*, the inner layer starting material 46*b* being subsequently sintered directly in the mold 48 if it is a ceramic material.

After independent production, the tubular inner layer 37 is suitably present as shown in the right half of the FIG. 5 as a tubular body 37*a* which is inherently stable independently of the support jacket 38 which has not yet been applied. This is subsequently combined with the support jacket 38 or the support jacket material in the manner described further below to obtain the cylinder tube 7 as a composite body.

A tubular inner layer 37 consisting of glass material may be realized by means of tubular glass manufactured in tubular form. The tubular glass is expediently drawn in tubular form from a molten glass during its manufacture and cut to the desired dimension of the cylinder tube 7, so that in turn the inherently stable tubular body 37*a* illustrated in the right half of FIG. 5 is obtained.

A further possibility for producing the tubular inner layer 37 consists in the corresponding bending forming of a flexible glass foil. This glass film is expediently joined materially after round bending in the region of the film end regions then facing each other, for example by bonding or welding.

Figure 6:
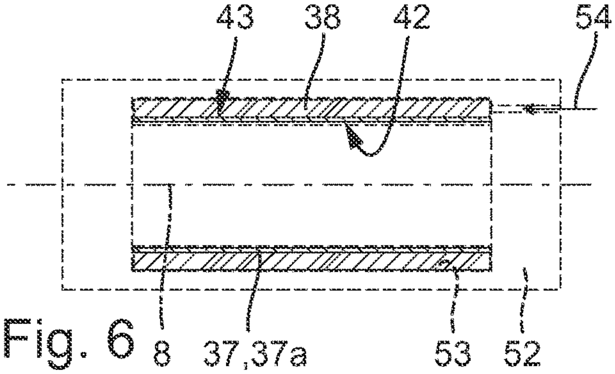

For the final manufacture of the cylinder tube 7, the tubular support jacket 38 shown in FIG. 6 can be combined with the inner layer 37 prefabricated as an inherently stable tubular body 37*a*. For this purpose, FIG. 6 shows a process step in which the tubular support jacket 38 is applied to the outer circumference of the prefabricated inner layer 37 during its initial forming by an injection molding process. The tubular support jacket 38 manufactured in this way can thus be referred to as an injection molded body.

In FIG. 6, a manufacturing process is illustrated which proceeds in the manner of an injection molding process. The tubular inner layer 37, prefabricated in particular in accordance with the above explanations, is placed here as an insert in a casting mold 52 indicated by dashed dots, so that radially outwardly around the inner layer 37 a sleeve-shaped shaping cavity 53 remains in the casting mold 52, into which the still unconsolidated, flowable support jacket material 54 is injected with a sufficient overpressure. After solidification of the injected support jacket material 54, there is expediently an adhesive bond between the material of the support jacket 38 and the inner layer 37, resulting in a cylinder tube 7 which is very easy to handle in the further manufacturing steps.

In an alternative manufacturing process illustrated in FIG. 7, the tubular support jacket 38 is manufactured independently of the inner layer 37 for manufacturing the cylinder tube 7 and is only subsequently combined with the inner layer 37.

For example, the tubular support jacket 38 is manufactured as an injection-molded body in the same way as described in connection with the manufacture of the inner layer 37 in FIG. 5. Alternatively, production by extrusion as an extruded body is also possible, for example. A further manufacturing possibility for the tubular support jacket 38 consists, in the case of a support jacket 38 to be manufactured from paper or cardboard or paperboard, in applying the raw material, which is still dimensionally unstable and present as a fiber suspension, around a mold core 47 and then compacting and drying it.

In this way, the tubular support jacket 38 is produced in particular as a tubular body 38*a* which is inherently stable independently of the inner layer 37.

Figure 7:
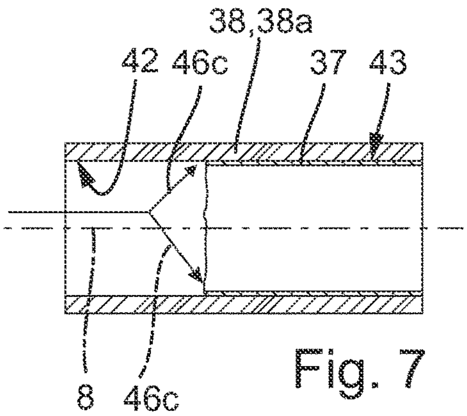

In a subsequent process step, an inner layer starting material 46*c* is applied to the inner circumferential surface 42 of the tubular body 38*a* of the prefabricated support jacket 38 as shown in FIG. 7, which after solidification forms the inner layer 37. This is preferably done by a suitable material application process, as shown by the arrow in FIG. 7, so that the finished inner layer 37 is an applied layer.

The layer formation of the inner layer 37 is carried out, for example, by sputtering, by vacuum deposition or by rotational coating or "spin coating". By means of the PVD or CVD processes already mentioned, a particularly thin inner layer 37 can be deposited on the inner circumferential surface 42 of the prefabricated support shell 38 with a high degree of process reliability.

Figure 8:
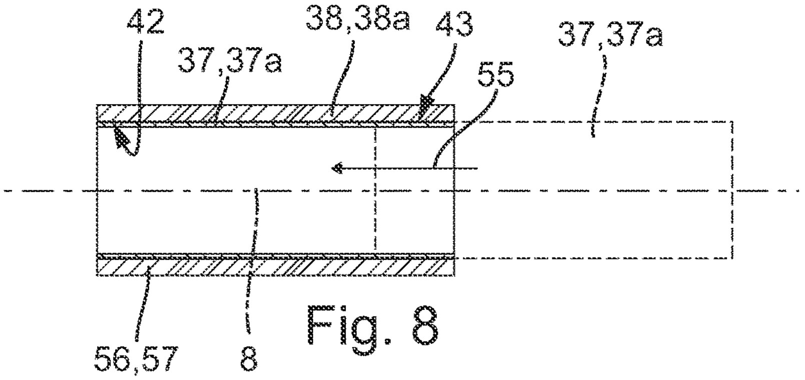

FIG. 8 illustrates a further embodiment of a manufacturing process suitable for the production of the working cylinder 1, again showing only the process of manufacturing the cylinder tube 7. In this process, the tubular support jacket 38 and the tubular inner layer 37 are manufactured independently of each other as inherently stable tubular bodies 37*a*, 38*a* in one of the ways already described above, whereupon these two tubular bodies 37*a*, 38*a* are joined together by coaxial nesting according to arrow 55. Prior to insertion into one another, the support jacket 38 expediently has an inner diameter which is slightly smaller than the outer diameter of the inner layer 37, so that the two tubular bodies 37*a*, 38*a* inserted into one another are diametrically pressed together with respect to the longitudinal axis 8 and are reliably joined together even without an additional adhesive layer.

In addition or alternatively, an adhesive layer 57 can be arranged in the hollow cylindrical joining region 56 between the two tubular bodies 37*a*, 38*a*, by means of which a material connection is effected between the supporting jacket 38 and the inner layer 37, so that there is a particularly high strength of the joined connection.

Figure 9:
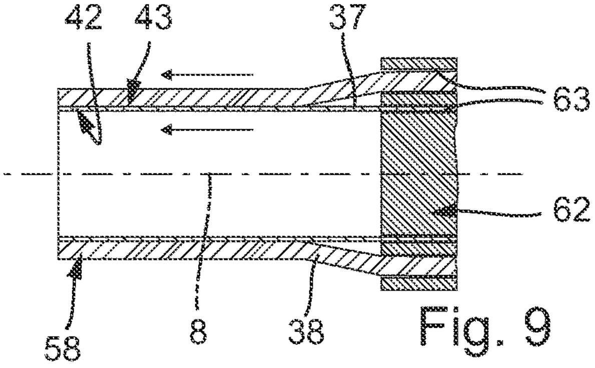

In a likewise advantageous manufacturing process illustrated in FIG. 9, the tubular inner layer 37 and the tubular support jacket 38 are again manufactured independently of one another, but are combined immediately during their manufacture by coextrusion to form a coextruded body 58 forming the cylinder tube 7. At 62, an end section of an extrusion die suitable for this purpose is schematically indicated, which has two mutually coaxial, annular extrusion nozzles 63 through which the still flowable starting material of the inner layer 37 and the support jacket 38 is pressed during coextrusion.

Figure 10:
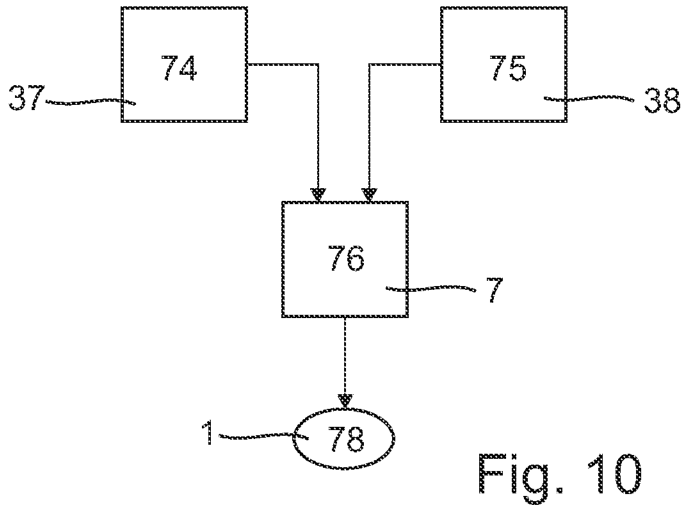
Figure 11:
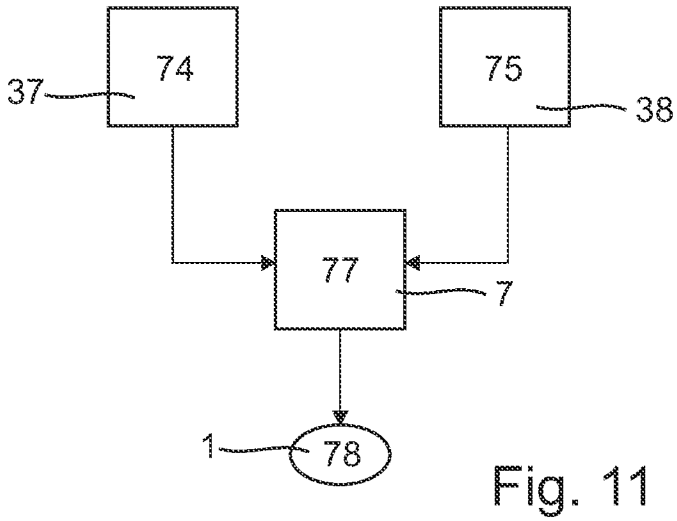

The process sequences specifically described above with reference to FIGS. 5 to 9 can be applied in a process for producing the working cylinder 1, which is schematically illustrated in FIGS. 10 and 11 with a focus on cylinder tube production in various embodiments.

In one aspect, in an inner layer manufacturing step 74, the tubular inner layer 37 is made of a diffusion-tight glass material or diffusion-tight ceramic material. Secondly, in a support jacket manufacturing step 75, the tubular support jacket 38 is made of a cellulose-containing and/or lignin-containing material. A composite body representing the cylinder tube 7 is produced by either a first manufacturing sequence 76 or a second manufacturing sequence 77. In the first manufacturing sequence 76, the cylinder tube 7 is produced by separately manufacturing each of the tubular inner layer 37 and the tubular support jacket 38 independently of each other and then combining them. In the alternative second manufacturing sequence 77, only either the tubular inner layer 37 or the tubular support jacket 38 is first manufactured separately, whereupon the respective other component, i.e. the support jacket 38 or the inner layer 37, is subsequently formed onto the separately manufactured component 37 or 38 during their original forming. In a final finishing operation 78, in each case the joining of the manufactured cylinder tube 7 with the other working cylinder components takes place to complete the working cylinder 1.

It is advantageous if at least one and preferably each of the two end walls 15, 16 are also constructed as composite bodies according to the same basic principles as the cylinder tube 7. In the illustrated embodiment example, this is the case.

Exemplarily, each end wall 15, 16 has a diffusion-tight wall inner layer 64 facing the cylinder chamber 6 and a wall outer layer 65 which is thicker in this respect and acts as a support layer for the wall inner layer 64 and is arranged on the outer surface 66 of the wall inner layer 64 facing axially away from the cylinder chamber 6.

The wall inner layer 64 of at least one end wall 15, 16 is made of a diffusion-tight glass material or diffusion-tight ceramic material comparable to the tubular inner layer 37 of the cylinder tube 7, while the wall outer layer 65 has a cellulose-containing and/or lignin-containing material structure corresponding to the configuration of the supporting jacket 38 of the cylinder tube 7.

In this way, in addition to the cylinder tube 7, the two end walls 15, 16 also result from sustainable production and, at the end of their lifecycle, allow easy recycling for reuse in the manufacture of a new working cylinder 1 or another product.

Deviating from the illustrated embodiment example, the end walls 15, 16 can also have a conventional structure, for example consist entirely of metal, such as aluminum or stainless steel, or be made of a plastic.

What is claimed is:

1. A fluid-actuated working cylinder, having a cylinder housing and a piston, which piston is displaceablv by fluid action and is arranged in a cylinder chamber enclosed by the cylinder housing, the cylinder housing having a cylinder tube whose inner circumferential surface forms a piston running surface against which the piston bears in a slidingly displaceable manner, wherein the cylinder tube is formed as a composite body with a tubular inner layer forming the piston running surface and a tubular support jacket enclosing the tubular inner layer with a radial supporting effect, wherein the tubular inner layer consists of a diffusion-tight glass material or of a diffusion-tight ceramic material and wherein the support jacket has a cellulose-containing and/or lignin-containing material structure, and wherein a layer thickness of the tubular inner layer is in a thickness range of 0.001 mm to 0.1 mm, in each case including the range limits.

2. The working cylinder according to claim 1, wherein the support jacket comprises a fiber composite consisting of natural fibers.

3. The working cylinder according to claim 2, wherein the support jacket has a grass-based and/or hemp-based and/or sisal-based structure.

4. The working cylinder according to claim 1, wherein the support jacket comprises paper and/or cardboard and/or paperboard or a wood fiber composite material.

5. The working cylinder according to claim 1, wherein the diffusion-tight glass material of the tubular inner layer is silicate glass or at least comprises a silicate glass and wherein the diffusion-tight ceramic material of the tubular inner layer is silicon carbide or aluminum oxide or zirconium oxide or at least includes silicon carbide or aluminum oxide or zirconium oxide.

6. The working cylinder according to claim 1, wherein the tubular inner layer is a tubular body manufactured independently of the supporting jacket and/or wherein the tubular inner layer is an inherently stable tubular body independent of the support jacket.

7. The working cylinder according to claim 6, wherein the tubular inner layer is produced by peripherally applying a tubular inner layer starting material to a mandrel-shaped mold core or wherein the tubular inner layer consisting of diffusion-tight glass material is tubular glass manufactured in tubular form or wherein the tubular inner layer consisting of diffusion-tight glass material is a tubular body formed from a flexible glass film.

8. The working cylinder according to claim 7, wherein the tubular support jacket consists of a support jacket material applied to an outer circumferential surface of the tubular inner layer and solidified only after application.

9. The working cylinder according to claim 7, wherein the tubular support jacket is an injection molded body applied externally to the tubular inner layer by an injection molding process.

10. The working cylinder according to claim 1, wherein the tubular support jacket is a tubular body manufactured independently of the tubular inner layer and/or wherein the tubular support jacket is an extrusion body or an injection-molded body and/or wherein the tubular support jacket is an inherently stable tubular body independent of the tubular inner layer.

11. The working cylinder according to claim 10, wherein the tubular inner layer is an application layer applied by a material application process to the inner circumferential surface of the tubular support jacket.

12. The working cylinder according to claim 10, wherein the tubular support jacket and the tubular inner layer are coaxially inserted into each other.

13. The working cylinder according to claim 12, wherein the tubular inner layer is inserted into the tibular support jacket and joined with the tubular support jacket in an hollow-cylindrical joining region by a material bond.

14. The working cylinder according to claim 1, wherein the tubular support jacket and the tubular inner layer form a coextruded body produced by coextrusion.

15. The working cylinder according to claim 1, wherein the supporting jacket is radially surrounded on the outside by a suitably diffusion-tight enveloping layer and/or wherein the supporting jacket is impregnated.

16. The working cylinder according to claim 1, wherein the cylinder housing has two end walls which are each arranged in the region of one of the two axial end faces of the cylinder tube, are fastened to the cylinder tube and bound the cylinder chamber at the end face, wherein at least one of the two end walls is penetrated by a drive fluid channel enabling the supply and discharge of a fluidic pressure medium for driving the piston.

17. The working cylinder according to claim 1, wherein a piston rod passing through the cylinder housing and projecting axially from the cylinder housing is arranged on the piston.

18. A fluid-actuated working cylinder, having a cylinder housing and a piston, which piston is displaceablv by fluid action and is arranged in a cylinder chamber enclosed by the cylinder housing, the cylinder housing having a cylinder tube whose inner circumferential surface forms a piston running surface against which the piston bears in a slidingly displaceable manner, wherein the cylinder tube is formed as a composite body with a tubular inner layer forming the piston running surface and a tubular support jacket enclosing the tubular inner layer with a radial supporting effect, wherein the tubular inner layer consists of a diffusion-tight glass material or of a diffusion-tight ceramic material and wherein the support jacket has a cellulose-containing and/or lignin-containing material structure, and wherein the cylinder housing has two end walls which are each arranged in the region of one of the two axial end faces of the cylinder tube, are fastened to the cylinder tube and bound the cylinder chamber at the end face, wherein at least one of the two end walls is penetrated by a drive fluid channel enabling the supply and discharge of a fluidic pressure medium for driving the piston, and wherein each end wall has a diffusion-tight wall inner layer facing the cylinder chamber and a wall outer layer which is thicker in relation thereto and acts as a support layer for the wall inner layer, the wall inner layer consisting of a diffusion-tight glass material or diffusion-tight ceramic material, and the wall outer layer having a cellulose-containing and/or lignin-containing material structure.

* * * * *